(12) United States Patent
Bloss

(10) Patent No.: US 11,330,810 B2
(45) Date of Patent: May 17, 2022

(54) PLANER BOARD WITH FLAT RETRIEVAL

(71) Applicant: Aaron D. Bloss, Gaylord, MI (US)

(72) Inventor: Aaron D. Bloss, Gaylord, MI (US)

( * ) Notice: Subject to any disclaimer, the term of this patent is extended or adjusted under 35 U.S.C. 154(b) by 157 days.

(21) Appl. No.: 16/713,175

(22) Filed: Dec. 13, 2019

(65) Prior Publication Data

US 2020/0187475 A1 Jun. 18, 2020

Related U.S. Application Data

(60) Provisional application No. 62/781,395, filed on Dec. 18, 2018.

(51) Int. Cl.
*A01K 91/06* (2006.01)
*A01K 93/00* (2006.01)

(52) U.S. Cl.
CPC .............. *A01K 91/06* (2013.01); *A01K 93/00* (2013.01)

(58) Field of Classification Search
CPC .................... A01K 91/06; A01K 91/08; A01K 91/00–053; A01K 93/00
See application file for complete search history.

(56) References Cited

U.S. PATENT DOCUMENTS

| | | | |
|---|---|---|---|
| 3,818,624 A | 6/1974 | Duffy | |
| 3,949,512 A * | 4/1976 | Stegemeyer | A01K 91/08 43/43.13 |
| 4,920,689 A * | 5/1990 | Anderson | A01K 91/08 43/26.1 |
| 4,951,413 A | 8/1990 | Blevins et al. | |
| 5,548,919 A * | 8/1996 | Hicks | A01K 91/08 43/43.13 |
| 5,875,583 A | 3/1999 | Church | |
| 6,243,983 B1 * | 6/2001 | Walker | A01K 91/08 43/43.12 |
| 6,412,215 B1 * | 7/2002 | Even | A01K 91/08 43/43.13 |
| 6,789,350 B1 * | 9/2004 | Link | A01K 91/08 43/17 |

(Continued)

OTHER PUBLICATIONS

Big Jon Sports; Side-Liner w/Otter Release; www.bigjon.com/product/side-liner-w-otter-release (internet advertisement); Jun. 11, 2018; 2 pages; Big Jon Sports, U.S.

*Primary Examiner* — Monica L Barlow
*Assistant Examiner* — Madeline L Douglas
(74) *Attorney, Agent, or Firm* — Mitchell Intellectual Property Law, PLLC

(57) ABSTRACT

A planer board with a multi-point connection to a fishing line comprising a side release clip with outer and inner gripping portions engaging different segments of fishing line with different release forces; a forward leverage line guide located at an upper portion of a head end of the planer board at a height above the side release clip, to laterally but not longitudinally secure a segment of fishing line therein; and a rear line guide at the tail end of the planer board for laterally but not longitudinally securing a segment of the fishing line therein. A first segment of fishing line gripped by the side release clip can be snapped out of engagement with the side release clip by a fisherman when a fish strikes, thereby applying a rotational force to the planer board through the forward leverage line guide to roll the planer board flat for a faster retrieval.

8 Claims, 11 Drawing Sheets

(56) References Cited

U.S. PATENT DOCUMENTS

| | | | |
|---|---|---|---|
| 7,520,087 B1* | 4/2009 | Even | A01K 91/08 43/43.13 |
| 2006/0207162 A1* | 9/2006 | Pieczynski | A01K 91/08 43/43.13 |
| 2008/0307692 A1* | 12/2008 | Hagen | A01K 91/08 43/43.13 |
| 2017/0150707 A1 | 6/2017 | Wakefield | |
| 2019/0053479 A1* | 2/2019 | Vergara | B63B 1/248 |

* cited by examiner

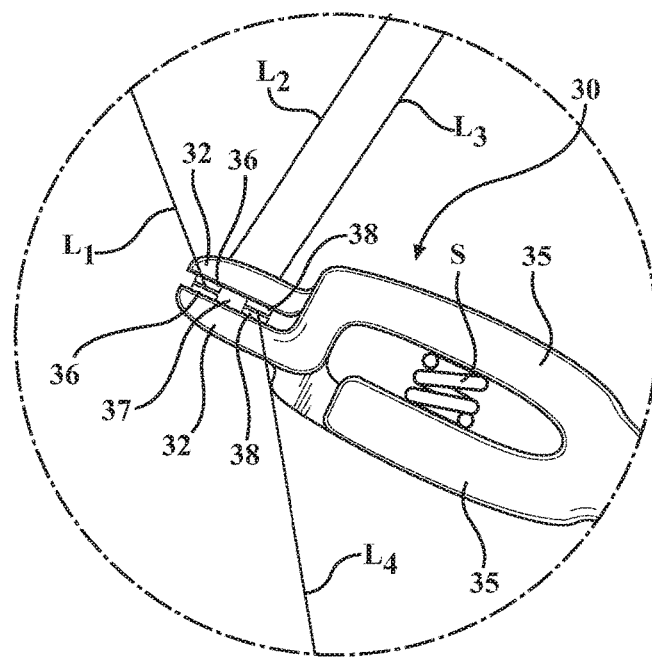
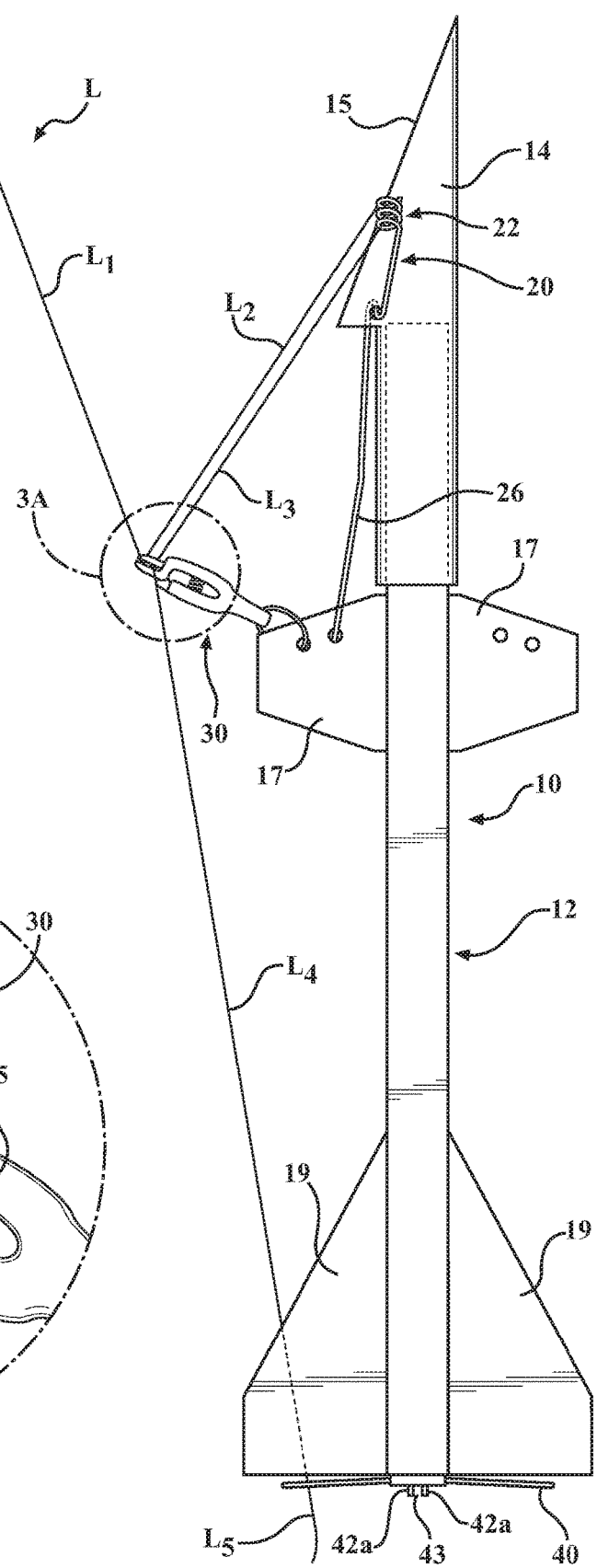

PLANER BOARD WITH FLAT RETRIEVAL

RELATED APPLICATIONS/PRIORITY BENEFIT CLAIM

This application claims the benefit of U.S. Provisional Application No. 62/781,395, filed Dec. 18, 2018 by the same inventor (Bloss), the entirety of which provisional application is hereby incorporated by reference.

FIELD

The subject matter of the present application is in the field of planer boards for fishing.

BACKGROUND

Planer boards are used for trolling type fishing to space the bait and the line both outwardly and rearwardly from the boat. The planer board typically has a vertical-plane board body; a tapered head angled to one side to bias the planer board outwardly from a given side of the boat; a rear or "tail" line guide that allows the fishing line to slide freely through it, but keeps the bait end of the line aligned with the plane of the board; and, a line gripping clip on the side of the board body facing the boat to keep the planer board in position on the line.

The line gripping clip often has alligator type clamping jaws lined with rubber pads at their outer ends to grip the line without damage, the jaws being operable with a squeeze to quickly release the line when a fisherman retrieves the board onto the boat. The rear line guide is will also usually have an opening or some other quick line release feature, so that the planer board can be completely removed from its two-point connection to the line.

BRIEF SUMMARY

The present invention is a planer board with a multi-point connection to a fishing line, the connection operable to flip the planer board onto its side for a faster and easier horizontal or "flat" retrieve from the water. The multi-point connection system comprises a rear line guide; an intermediate side release clip with an outer gripping surface and an inner gripping surface, each gripping surface having a different release force and configured to be connected to a separate longitudinal segment of the fishing line; and a forward line leverage guide on an upper side of the head.

In use, the planer board is combined with a fishing line connected at a first end to a fishing pole on a boat and at a second end to a baited hook trailing behind the boat. A first line segment closest to the fishing pole is non-slidingly secured to the outer gripping surface on the side release clip with a first release force; a second line segment is slidingly secured through the forward line leverage guide; a third line segment is non-slidingly secured to the inner gripping surface of the side release clip with a second greater release force; and a fourth line segment is slidingly engaged with the rear line guide. The rear line guide and the forward line leverage guide include lateral release openings to quickly insert and remove the line.

In one form, the forward line leverage guide comprises a tubular body with a central passage for the line, and with a spiral opening so that the line can be wound on and off quickly. In a preferred form the tubular body takes the form of an elongated spiral coil or "pigtail".

In a further form, the rear line guide is configured for use on either side of the planer board, the tapered head can be reversed to face left or right on the forward end of the board, and the side release clip can be removed and re-attached to either side of the board in order to re-orient the planer board for use on either side of a boat. In a preferred form, the rear line guide comprises a single fixed loop with two spaced ends defining a line release opening at a central lower portion.

In yet a further form, the forward leverage line guide can be provide as an aftermarket attachment for another planer board already having a rear line guide and a side release clip.

These and other features and advantages of the invention will become apparent from the detailed description below, in light of the accompanying drawings.

BRIEF DESCRIPTION OF THE DRAWINGS

FIG. 3 is a detail plan view of the planer board of FIG. 1 attached to a fishing line between a boat and a baited end trailing behind and to one side of the boat.

FIG. 3A is a detail view of the side release clip of FIG. 3 and its attachment to the fishing line.

DETAILED DESCRIPTION

Figure 1:
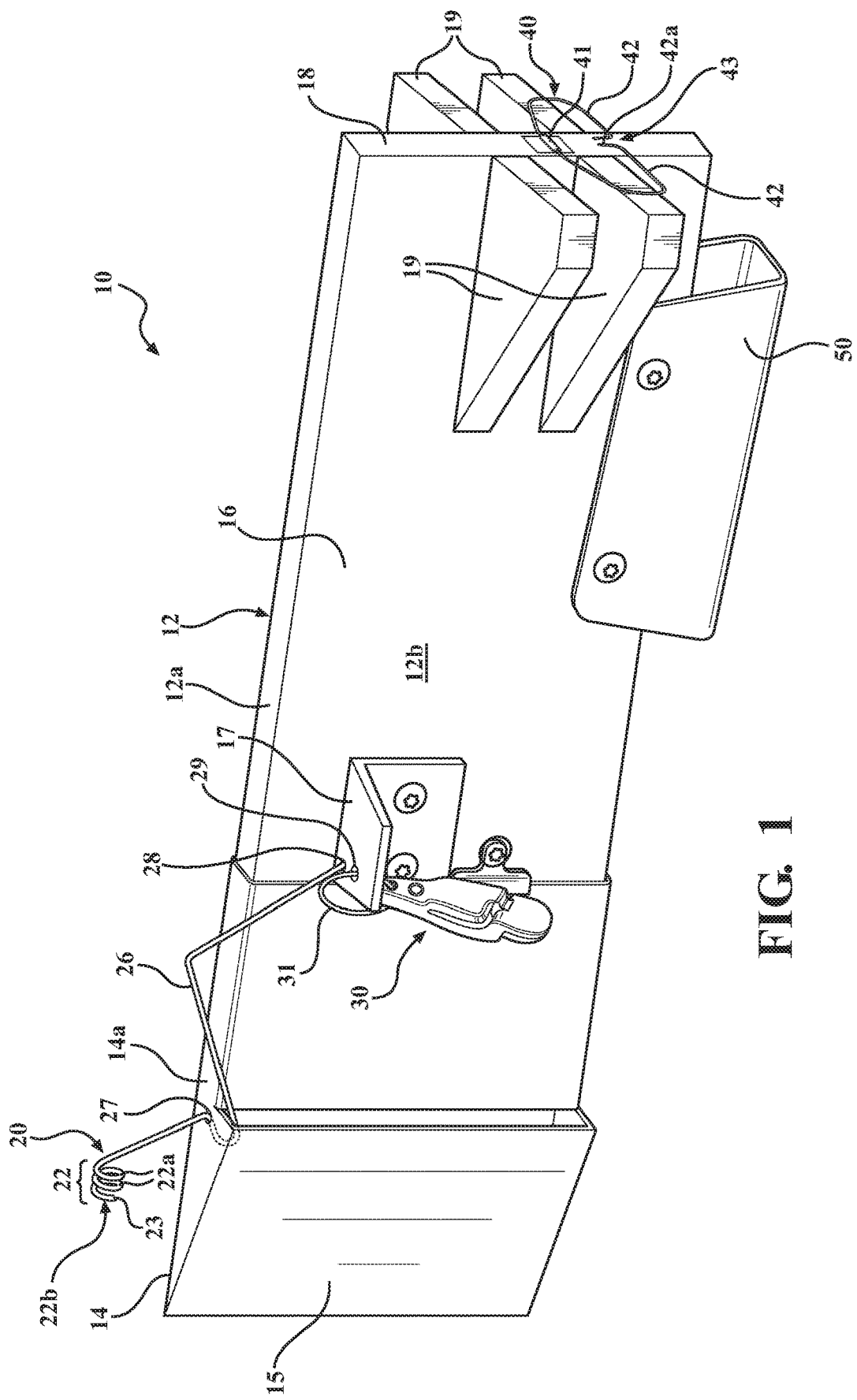
FIG. 1 is a side perspective view of an example planer board according to the invention.

Referring first to FIG. 1, a planer board 10 is shown in exemplary form in order to teach how to make and use the claimed invention. Illustrated planer board 10 has a substantially flat, generally rectangular board body 12 made from a lightweight, water-resistant, floating material such as wood or foam. The forward end or head 14 of planer board 10 has an angled wedge face 15. A middle or intermediate portion 16 of body 12 includes clip support brackets 17. A rear or tail end of 18 of body 12 includes at least one set of stabilizer fins, and preferably two vertically spaced pairs of stabilizer fins 19 as shown in the illustrated example.

Figure 2:
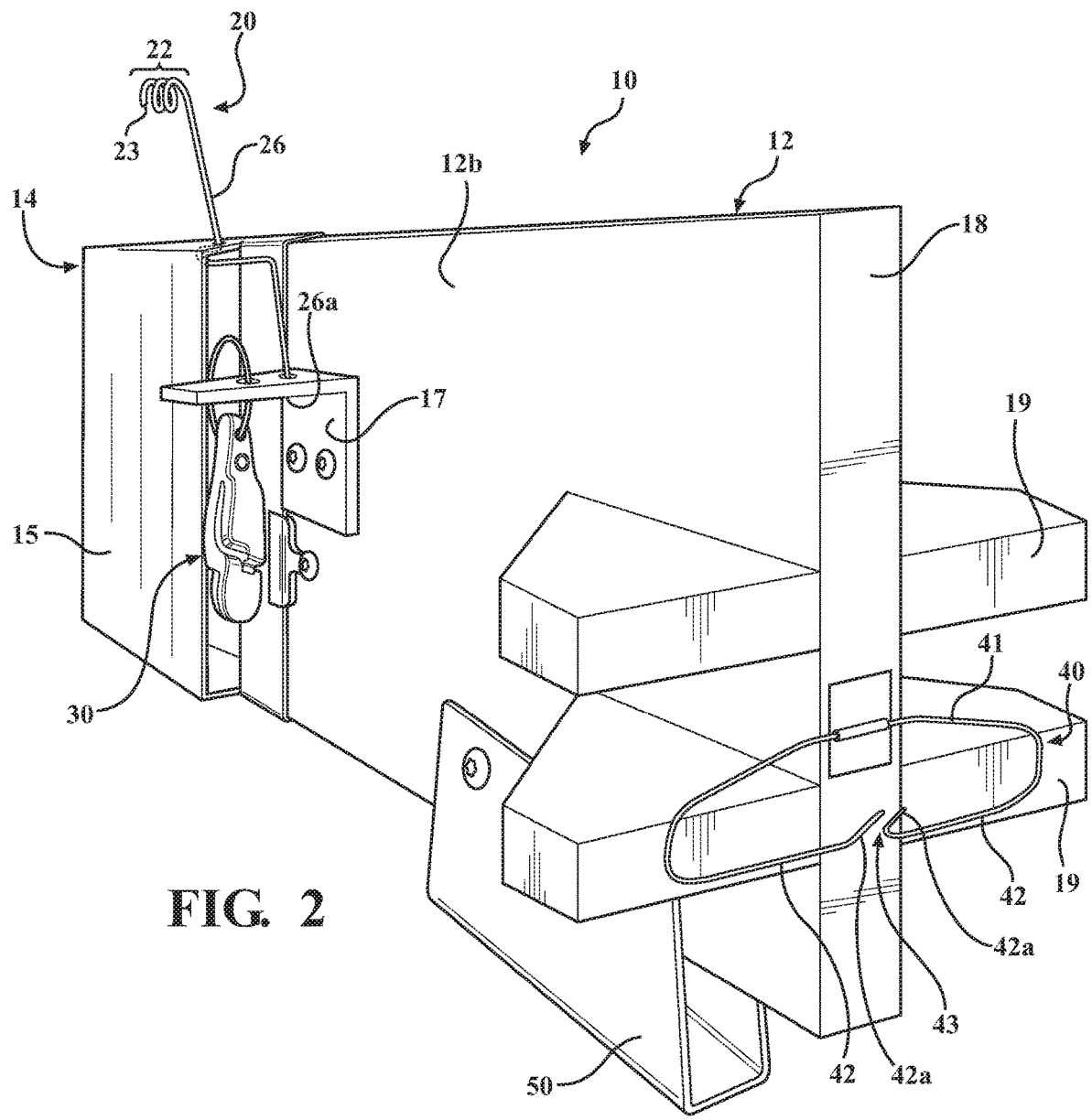
FIG. 2 is a rear perspective view of the planer board of FIG. 1.

A forward leverage line guide 20 projects vertically from an upper forward portion of the planer board at or near head 14, preferably along an upper edge 12a of the board body or of head 14 aligned with or overlapping the upper edge 12a, forwardly of and above clip support bracket 17. Leverage line guide includes a tubular body 22 with one or more lateral openings 22a sufficient for passing a segment of the fishing line laterally into the body 22 into a central line passage 24. In the illustrated example, line guide 20 is made from stiff wire and tubular body 22 is an elongated spiral coil, the line guide 20 mounted on the planer board upper edge via a multi-angled leg 26 engaging a first hole 27 formed in the head 14, the leg 26 having a hook end 26a (FIG. 2) engaging a second hole 28 formed in a same-side support bracket 17 near the side face 12b of body 12.

Figure 7:
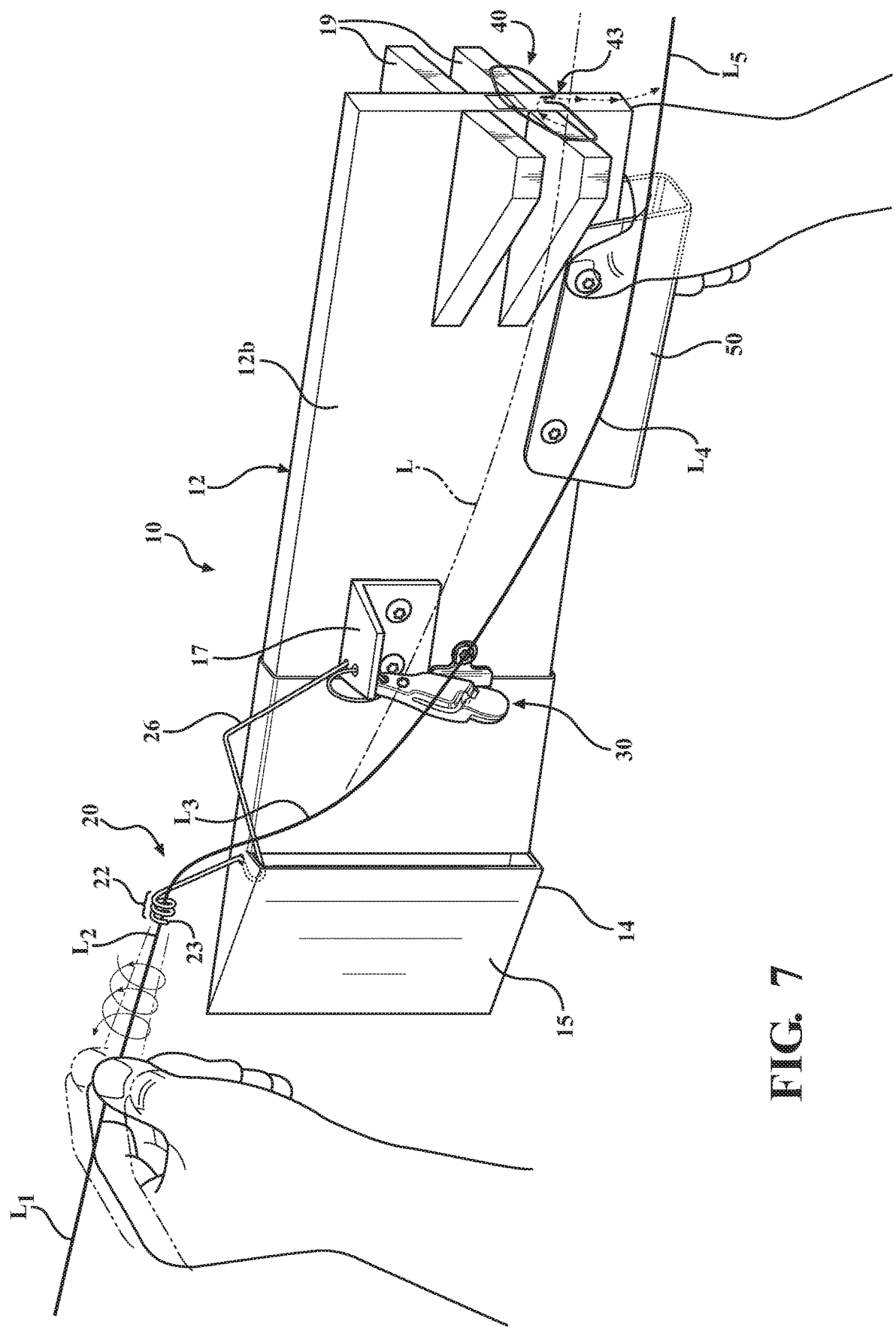
FIG. 7 is similar to FIG. 1, schematically showing removal of the fishing line from the front and rear line guide connection points on the planer board after the planer board has been retrieved onto the boat.

The spaced coils of the tubular body 22 of line guide 20 are configured to receive a fishing line by winding a segment of the line laterally into the continuous spiral openings 22a formed between the coils, beginning at the open forward end or tip 23 of the coil until the line rests longitudinally in central passage 22b (see FIG. 7 for a schematic representation). The tubular body 22 of line guide 20, in the illustrated example formed by two or more spaced coils, is generally aligned in parallel with the plane of board body 12, and is preferably centered on the plane of the board body so as to work with a line attached from either side of the planer board. Alternately, the line guide 20 could be located more to one side or the other of the board body if dedicated to fishing from one side of the boat; or, the line guide 20 could be made to be attached to and detached from the board body with the tubular body 22 in different orientations relative to either side of the board body in order to use the same planer board 10 from different sides of a boat.

The tubular body 22 of line guide 20 is located at or near (and preferably above) the upper edge of the board body 12, and preferably above the upper edges 12a, 14a of the board body as illustrated in the example, to provide a rotational leverage discussed below.

A side release clip 30 is mounted in known fashion to the side 12b of board body 12, in the illustrated example with a detachable swivel connection 31 to a hole 29 formed in the same-side support bracket 17. Side release clip 30 may generally be a conventional, known type of commercially available clip comprising jaws 32 biased together by a spring force (shown schematically as spring S in FIG. 3A, or optionally molded as a bias force into the clip if a unitary body made from a springy material) and openable by squeezing inner ends 35. However, jaws 32 of side release clip 30 in the present invention include novel differential-force inner and outer line gripping regions, in the illustrated example formed by a first pair of outer line grip pads 36 facing each other from opposing inner faces of outer ends of the jaws 32, and a pair of inner line grip pads 38 facing each other from opposing faces of inner ends of the jaws 32. The outer and inner line grip pads 36 and 38 are preferably spaced from each other by a gap 37 and formed of a rubber or similar durable resilient material that will not abrade fishing line. The sets of outer and inner line grip pads 36, 38 have a different grip strength on fishing line due to factors such as different surface texturing (e.g., smooth versus rough or patterned), different materials (e.g., harder or softer, or differing coefficients of friction), and/or different thicknesses. Specifically, the inner line grip pads 38 are configured to require greater force for the line to be pulled free from between them when the jaws 32 are closed than from between outer pads 36. While rubber-like gripping pads are illustrated and preferred, it may be possible to form the inner and outer gripping surfaces on clip 30 in other ways, for example with different surfaces formed or molded directly into the inner faces of the jaws, or with friction materials other than rubber added to the jaws' line-engaging surfaces.

Planer board 10 further comprises a rear line guide 40 attached to tail end 18. Rear line guide 40 is generally set in a vertical plane closely adjacent to, or flexibly or pivotally biased against, the tail end 18 of the board body, with enough spacing or "give" over at least a portion of the guide to allow a segment of the fishing line to be passed laterally between the rear line guide and the tail end 18 (and, where the tail of the planer board includes fins 19 as shown, between the rear line guide and the rear faces of the fins). In the illustrated example, rear line guide 40 comprises an open-ended loop of wire secured at an upper part 41 to the planer board body with adhesive or a mechanical or molded connection. The lower part 42 of the loop comprises spaced ends 42a defining a gap 43 therebetween. Spaced ends 42a are angled upwardly relative to lower part 42 (i.e. inwardly toward the interior of the loop), and are preferably bent outwardly from the plane of the loop and from the adjacent faces on the board body so that a segment of fishing line can be passed laterally (vs. longitudinally) between the ends 42a through gap 43 and into the interior of the loop. The spaced ends 42a divide the rear line guide 40 into left and right halves on either side of board body 12, so that the fishing line can be positioned in rear line guide 40 on the same side 12b of board body 12 as side release clip 30. Portions of the upper part 41 of the loop are positioned in alignment with the spacing between the illustrated fins 19 to allow a laterally inserted segment of fishing line to then pass longitudinally through the fins and the rear line guide. The upwardly (and preferably outwardly) angled ends 42a of the rear line guide 40 also serve to keep the fishing line on a corresponding side of the loop while fishing.

Planer board 10 also preferably includes a weighted keel 50, in the illustrated example positioned toward the rear or tail half of the board body 12 to maintain the tail end low and/or submerged in the water when trolling, and to maintain the leverage line guide 20 and the side release clip 30 at the front half of the planer board above the surface of the water when trolling.

Referring to FIGS. 3, 3A, and 7, planer board 10 is attached to a fishing line L as follows. A first, upstream segment L1-L2 of the fishing line closest to the fishing rod 102 on boat 100 is secured between outer grip pads 36 on side release clip 30. A second segment L2-L3 of the fishing line downstream (relative to the fishing pole) is wound laterally around forward leverage line guide 20 until it rests longitudinally in central passage 22b. A third segment L3-L4 of the fishing line downstream of segment L2-L3 is secured between inner grip pads 38 on the inner part of the side release clip jaws 32. A fourth segment L4-L5 of the fishing line downstream of segment L3-L4 is passed laterally through gap 43 in rear line guide 40 and placed in the line guide half on the same side as release clip 30.

Fishing line segments L2-L3 and L4-L5 are trapped laterally but not longitudinally in forward leverage line guide 20 and rear line guide 40. However, the fishing line segments L1-L2 and L3-L4 engaged by side release clip 30 are trapped both laterally and longitudinally between their respective grip pad sets 36, 38. The friction of inner grip pads 38 is selected or adjusted to be sufficient to prevent any longitudinal movement of the fishing line L therethrough while trolling, and also to prevent longitudinal movement of the fishing line after a fish strikes and is fighting the line from the baited end.

Figure 4:
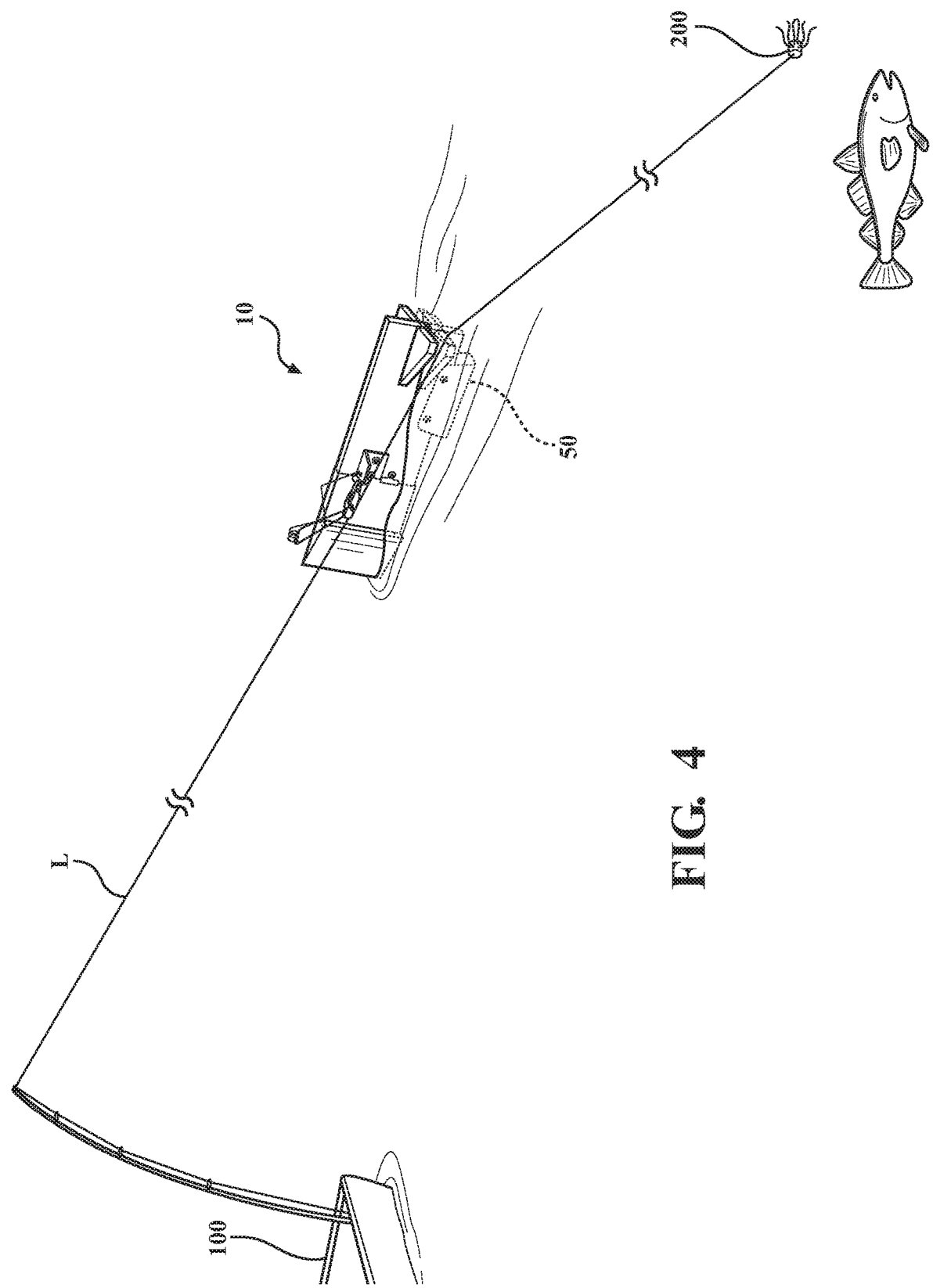
FIG. 4 is a perspective view of the planer board as connected in FIG. 3, in use behind and to one side of a boat.
Figure 4A:
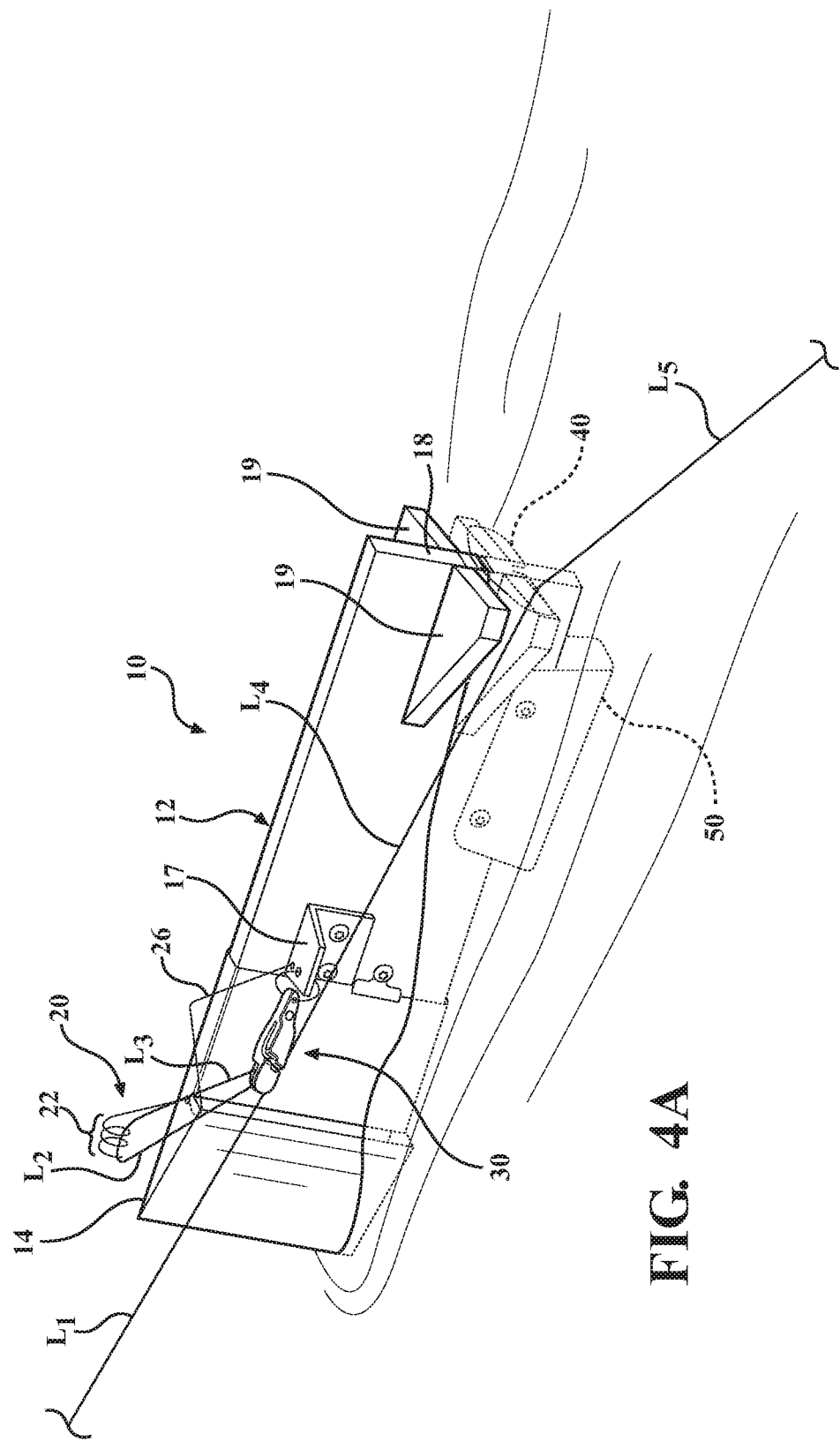
FIG. 4A is a detail view of the planer board line attachment of FIG. 4.

Referring to FIGS. 4 and 4A, planer board 10 is attached to the fishing line as described above, and placed in the water with the board body naturally weighted by keel 50 to a vertical-plane trolling position. The tapered head 14 and side release clip attachment to the fishing line L keep planer board 10 and baited end 200 of the fishing line tracking behind and outwardly to the side of boat 100 as the boat trolls along.

Figure 5:
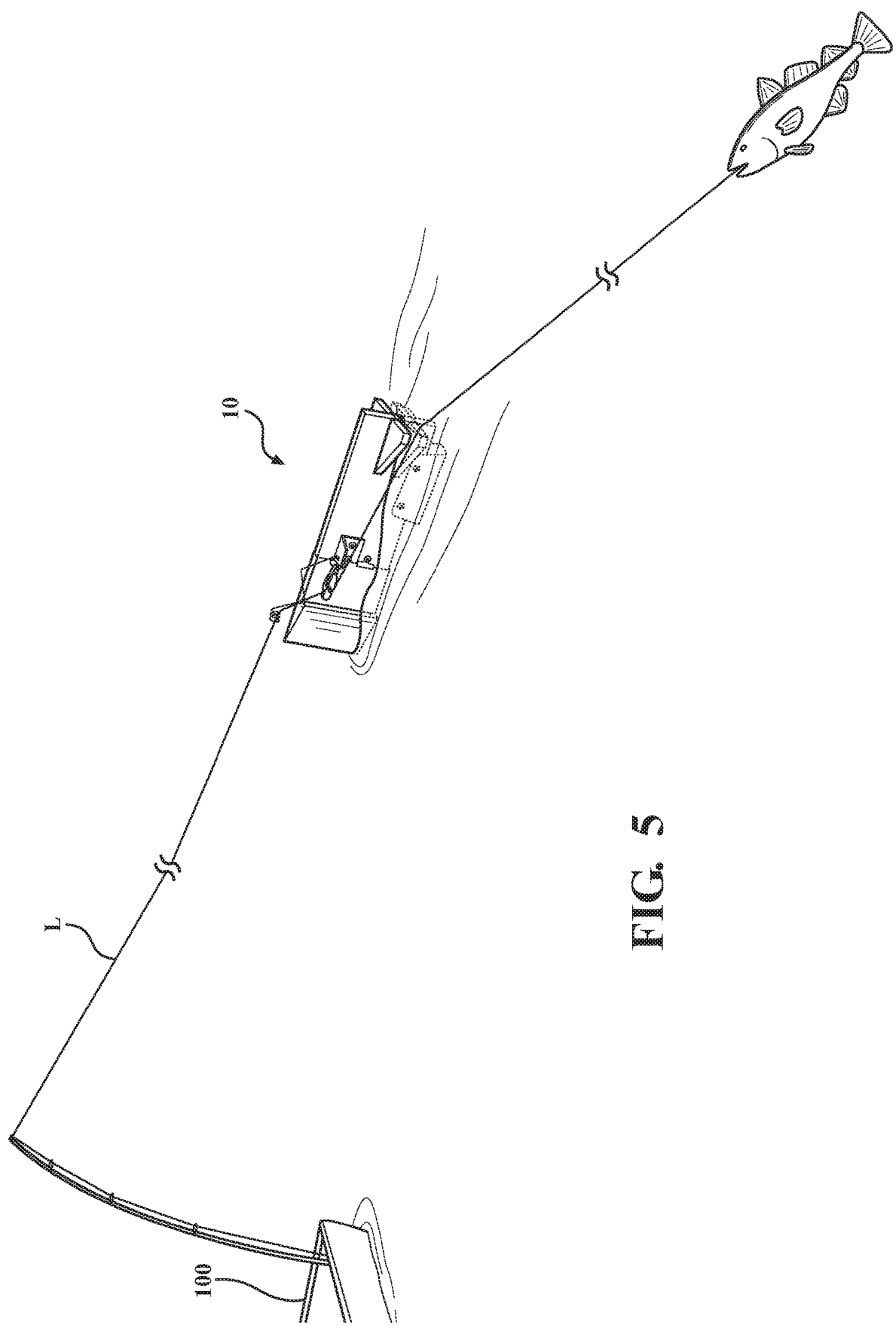
FIG. 5 is similar to FIG. 4, showing a first segment of fishing line released from the planer board in response to a fish strike.
Figure 5A:
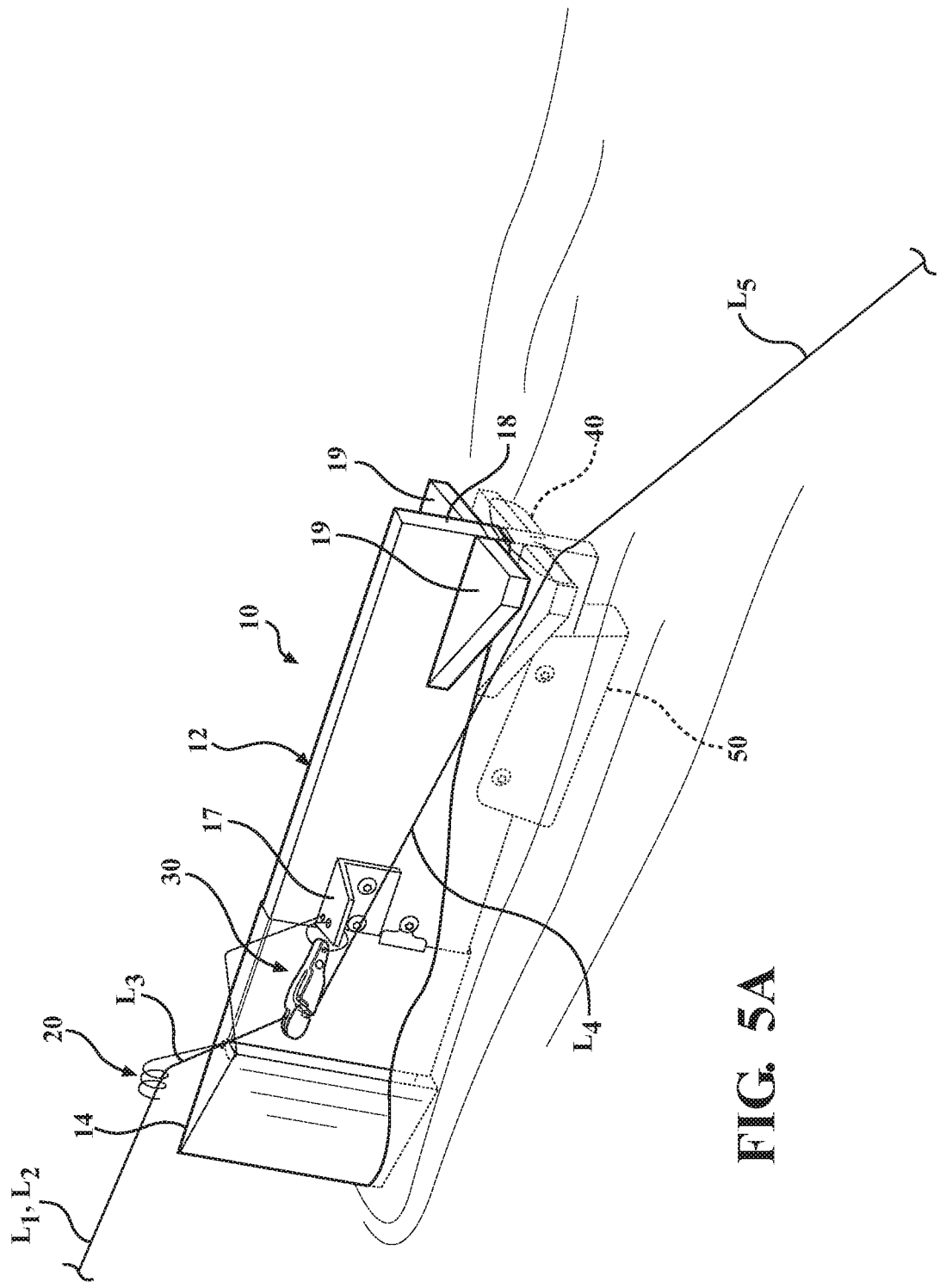
FIG. 5A is a detail view of the planer board line attachment of FIG. 5.
Figure 6:
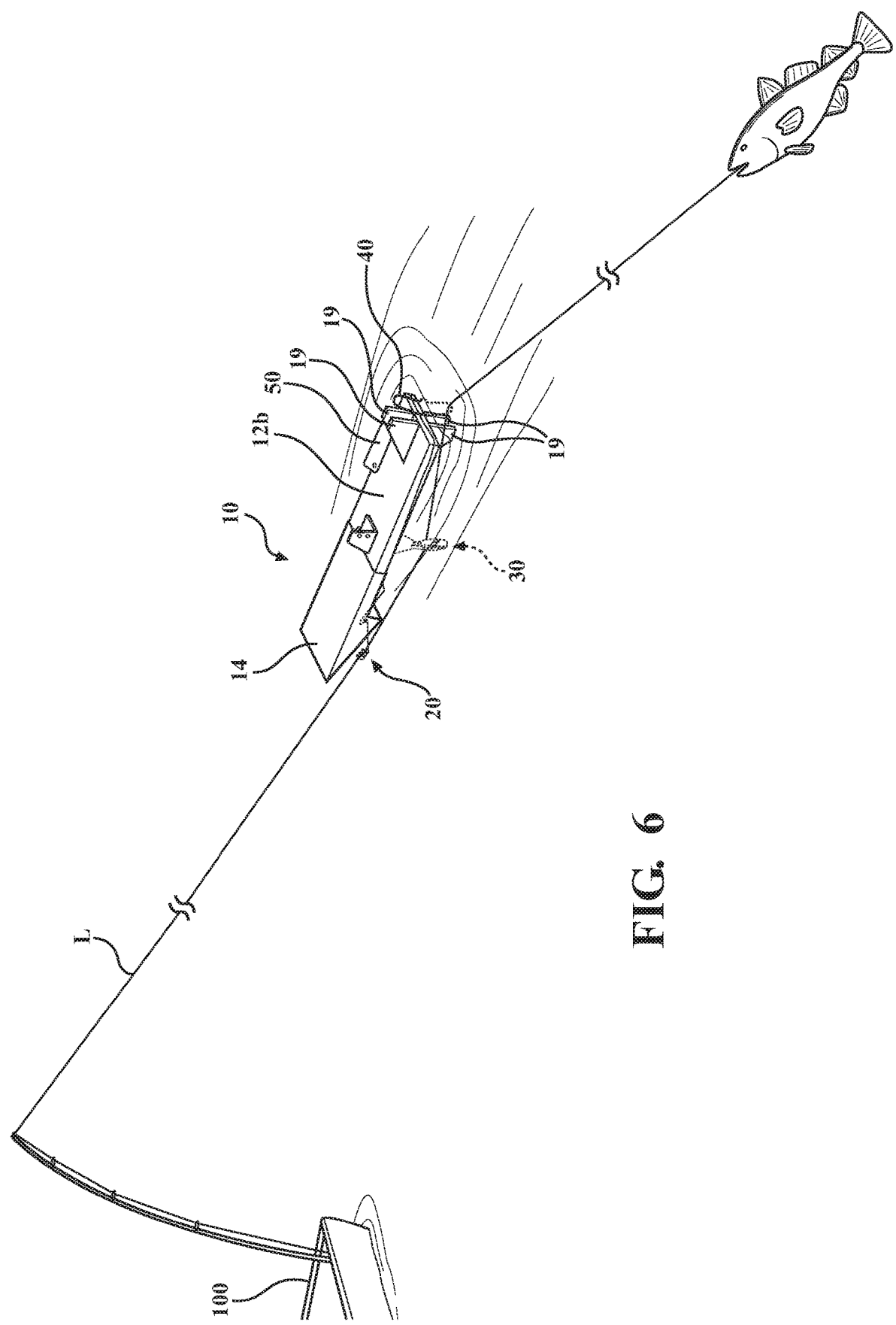
FIG. 6 is similar to FIG. 4, but showing the planer board rotated to a horizontal position by a pulling force on the fishing line from the boat during retrieval.

Referring to FIG. 5, when a fish strikes and is detected by a fisherman on the boat 100, the fisherman gives a lateral tug or yank on the fishing line with rod 102, in the direction of the arrow, toward the boat. This tug pulls line segment L1-L2 laterally free from the outer grip pads 36 on side release clip 30, which grip pads have a gripping force selected or adjusted to allow such a lateral force to pull the line segment free. Because line segment L3-L4 is still trapped against both lateral and longitudinal movement by the inner grip pads 38 on the side release clip, further force exerted by the fisherman through rod 102 on line L acts laterally (in the somewhat sideways direction of the boat) on the body 22 of forward leverage line guide 20. This results in planer board 10 being rotated over onto side face 12b into a flat retrieval position as shown in FIG. 6. The fisherman then reels the planer board onto the boat in this flat retrieval position, as shown in FIG. 7. Once the planer board 10 is retrieved onto the boat, the fisherman can then quickly disconnect the remaining line segments from the planer board by 1) unwinding segment L2-L3 from the spiral coils of leverage line guide 20, 2) unclipping line segment L3-L4 from side release clip 30 by squeezing the handle ends 35 of the jaws 32, and 3) pulling segment L4-L5 free from the rear line guide 40 by moving it over the adjacent end leg 42a and pulling it out through gap 43.

Figure 8:
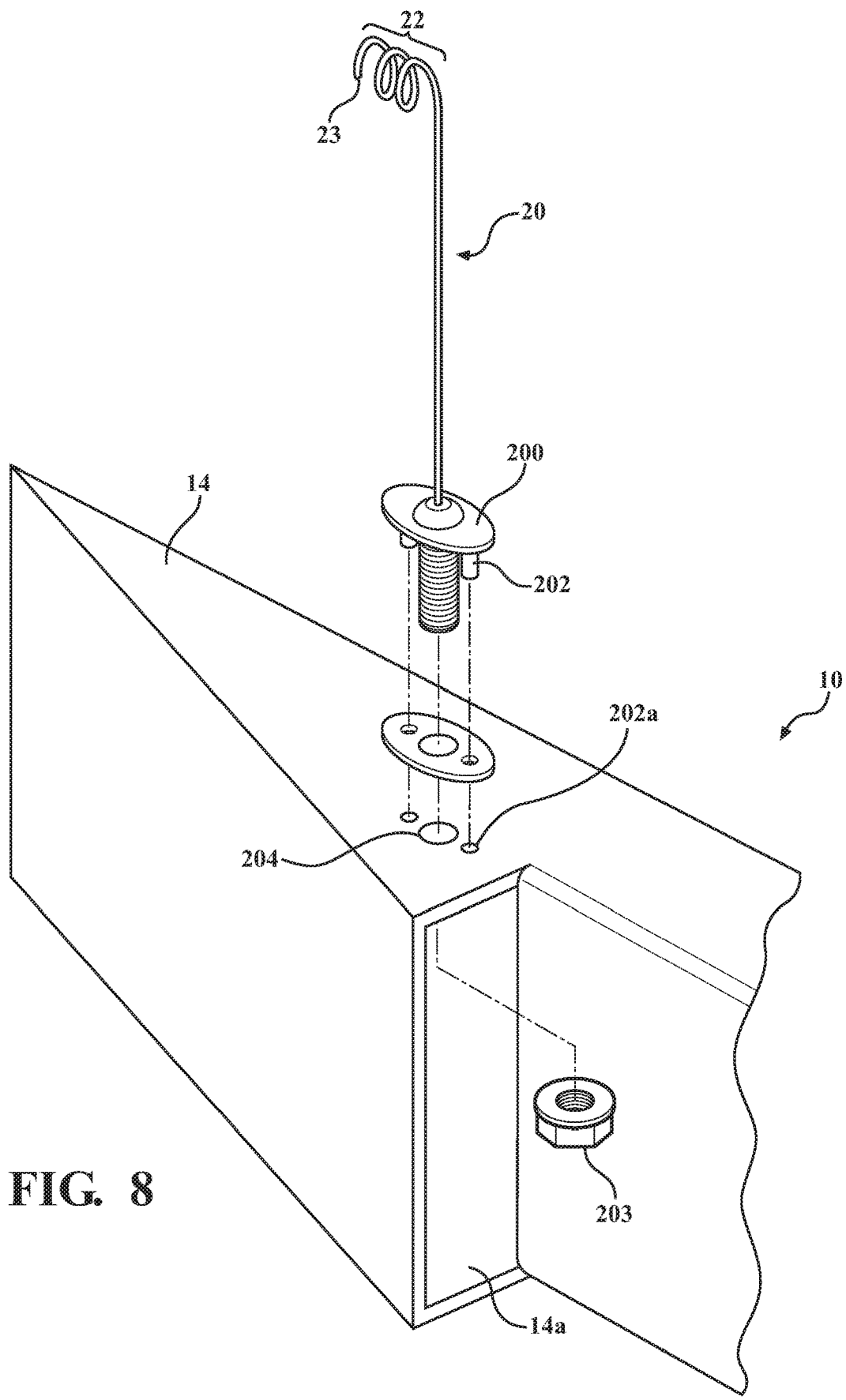
FIG. 8 shows an alternate attachment structure for the front line guide of the planer board of FIG. 1.

Referring to FIG. 8, an alternate attachment structure is shown for forward leverage line guide 20. The wire body of line guide 20 may be anchored in a threaded connector structure 200, preferably with anti-rotation features such as studs or pins 202 on the connector base and matching bores 202a formed in the planer board. The connector base 200 can be secured in a threaded socket 204 formed in the upper, forward part of the planer board 10 at or near head 14. In the illustrated example, head 14 is made from a hollow plastic body with an exposed rear opening 14a, and a nut 203 can be inserted to lock the threaded connector base 200 of the forward line guide in place. This type of alternate connector structure would allow line guide 20 to be easily retrofitted onto other types of planer board, if desired, using different types of threaded bolt/screw and socket/receiver structures inserted into the upper forward part of the planer board near the head.

Figure 9:
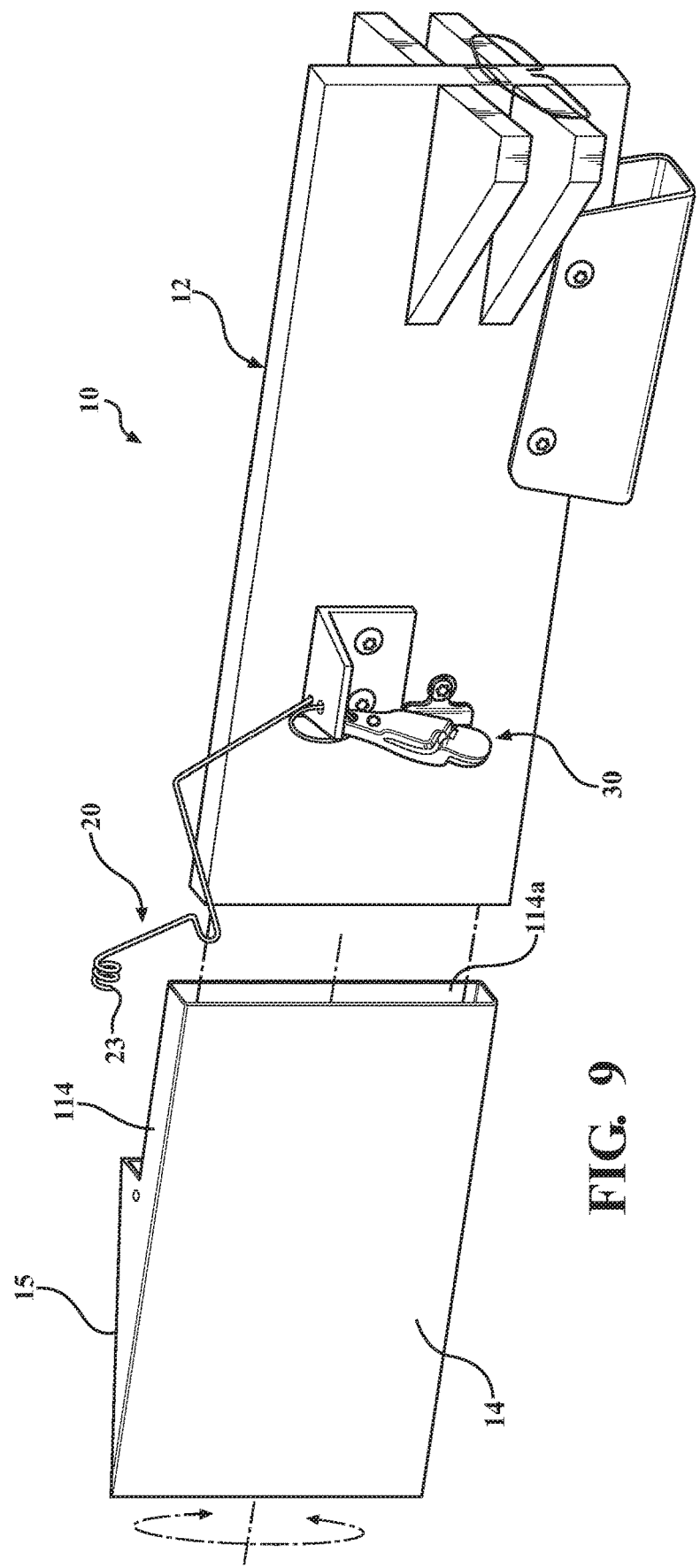
FIG. 9 is similar to FIG. 1, but shows a tapered head portion of the planer board exploded from the board body and rotated for reattachment in order to be used from an opposite side of a boat.

FIG. 9 shows head 14 with a hollow base 114 having a rear opening 114a adapted to fit closely but removably over the forward end of planer board body 12 so that the orientation of head 14 can be reversed on the planer board 10 for use on different sides of a boat. Head 14 may be locked in place on the board body 12 with the engagement of forward leverage line guide 20 through hole 27 in the upper side of head 14, as shown in previous Figs., or with any other form of releasable connection, for example with a friction fit or clips.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been used to describe new and useful improvements in science and the useful arts. The scope of the invention supported by the above disclosure should accordingly be construed within the scope of what it teaches and suggests to those skilled in the art, and within the scope of any claims that the above disclosure supports in this application or in any other application claiming priority to this application.

The invention claimed is:

1. A planer board with a multi-point connection for a fishing line, the planer board comprising an elongated substantially flat board body configured to be oriented in a vertical plane when fishing, the board body comprising two substantially flat sides, a longitudinal upper edge, a longitudinal lower edge, a head end, and a tail end, the head end spaced from the tail end a first greater distance in a longitudinal direction and the two substantially flat sides spaced from each other a second lesser distance in a lateral direction generally perpendicular to the longitudinal direction, wherein:

one of the two sides includes a side release clip comprising an inner end connected to the one of the two sides and further comprising a laterally outer gripping surface farther from the inner end of the side release clip and configured to grip an upstream segment of fishing line with a first lateral release force allowing the upstream segment of fishing line to be pulled laterally free from the side release clip and comprising a laterally inner gripping surface closer to the inner end of the side release clip and configured to grip a downstream segment of fishing line with a second release force preventing lateral and longitudinal movement of the downstream segment of fishing line;

the tail end includes a rear line guide configured to guide a tail segment of fishing line longitudinally therethrough and to secure the tail segment of fishing line therein in the lateral direction but not in the longitudinal direction; and, the head end includes a forward line leverage guide at or adjacent the upper edge forwardly of and above the side release clip, the forward line leverage guide configured to guide a head segment of fishing line longitudinally therethrough and to secure the head segment of fishing line therein in the lateral direction but not in the longitudinal direction.

2. The planer board of claim 1, wherein the forward line leverage guide comprises a tubular body aligned in the longitudinal direction generally parallel to the upper edge and including one or more lateral openings.

3. The planer board of claim 2, wherein the tubular body comprises a plurality of spaced spiral coils with lateral spacing between the coils.

4. The planer board of claim 2, wherein the tubular body is spaced above the upper edge of the board body.

5. The planer board of claim 4, wherein the tubular body is spaced above the upper edge substantially in longitudinal alignment with the upper edge.

6. The planer board of claim 1, wherein the rear line guide comprises an open loop comprising an upper continuous leg portion and lower leg portions with terminal ends spaced laterally by a gap, the terminal ends of the lower leg portions angled upwardly and outwardly away from the tail end.

7. The planer board of claim 1, wherein the tubular body is spaced above the upper edge substantially in longitudinal alignment with the upper edge.

8. In combination with a fishing line connected at a first end to a fishing rod on a boat and connected at a second end to a baited hook or equivalent fish catching device at a distance from the boat, a planer board with a multi-point connection to the fishing line, the planer board comprising a substantially flat board body configured to be oriented in a vertical plane when fishing, the board body comprising two substantially flat sides, a longitudinal upper edge, a longitudinal lower edge, a head end, and a tail end, the head end spaced from the tail end a first greater distance in a longitudinal direction and the two substantially flat sides spaced from each other a second lesser distance in a lateral direction generally perpendicular to the longitudinal direction, wherein:

one of the two sides includes a side release clip comprising an inner end connected to the one of the two sides and further comprising a laterally outer gripping surface farther from the inner end of the side release clip and gripping a first upstream segment of fishing line closest to the fishing rod with a first lateral release force allowing the upstream segment of fishing line to be pulled laterally free from the side release clip by the fishing rod and comprising a laterally inner gripping surface closer to the inner end of the side release clip and configured to grip a third downstream segment of fishing line with a second release force preventing lateral and longitudinal movement of the third downstream segment of fishing line;

the tail end includes a rear line guide securing a fourth downstream segment of fishing line therein in the lateral direction but not in the longitudinal direction; and, the head end includes a forward line leverage guide on or adjacent the upper edge forwardly of and above the side release clip, the forward line leverage guide securing a second downstream segment of fishing line therein in the lateral direction but not in the longitudinal direction.

\* \* \* \* \*